United States Patent
Chini et al.

(10) Patent No.: US 6,845,963 B2
(45) Date of Patent: Jan. 25, 2005

(54) BUTTERFLY VALVE FOR AN INTERNAL COMBUSTION ENGINE WITH DISSIPATION OF ELECTROSTATIC CHARGES AND A RELATIVE ACTUATOR

(75) Inventors: Fabrizio Chini, Rovereto (IT); Giorgio Ferretti, Ferrara (IT); Roberto Piciotti, Bologna (IT)

(73) Assignee: Magneti Marelli Powertrain S.p.A., Corbetta (IT)

(*) Notice: Subject to any disclaimer, the term of this patent is extended or adjusted under 35 U.S.C. 154(b) by 17 days.

(21) Appl. No.: 10/455,221

(22) Filed: Jun. 5, 2003

(65) Prior Publication Data

US 2004/0065856 A1 Apr. 8, 2004

(30) Foreign Application Priority Data

Jun. 7, 2002 (IT) .................................... BO2002A0358

(51) Int. Cl.[7] .............................................. F16K 31/02
(52) U.S. Cl. ...................... 251/129.11; 251/305; 310/71
(58) Field of Search ....................... 251/129.11, 129.12, 251/129.13, 305; 310/71

(56) References Cited

U.S. PATENT DOCUMENTS 5,803,430 A     9/1998 Buchl .................... 251/129.11
6,435,163 B1    8/2002 Fauser et al. ............... 123/509
6,435,473 B1 *  8/2002 Dall'Osso et al. ...... 251/129.11

FOREIGN PATENT DOCUMENTS

EP          0 096 366        12/1983
EP          0 968 364        1/2000

* cited by examiner

Primary Examiner—Edward K. Look
Assistant Examiner—John K. Fristoe, Jr.
(74) Attorney, Agent, or Firm—Baker & Daniels

(57) ABSTRACT

A butterfly valve for an internal combustion engine; a valve body houses a valve seat engaged by a butterfly body keyed on a shaft in order to rotate between an open position and a closed position under the action of an electric actuator coupled to the shaft by means of a cascade of gears; the electric actuator has a cylindrical body which is bounded at the location of tits base by a metal plate electrically connected to the valve body and provided with a pair of through holes through which two electrical conductors pass and supply electricity to the electric actuator; two respective bushings are interposed between the conductors and the holes of the plate, each of which is disposed electrically in contact both with the metal plate and with the respective electrical conductor and is made from partially conducting material having a specific resistance of between $10^3$ and $10^6$ Ohm·cm.

31 Claims, 2 Drawing Sheets

BUTTERFLY VALVE FOR AN INTERNAL COMBUSTION ENGINE WITH DISSIPATION OF ELECTROSTATIC CHARGES AND A RELATIVE ACTUATOR

The present invention relates to a butterfly valve for an internal combustion engine.

BACKGROUND OF THE INVENTION

Internal combustion engines supplied by petrol are normally fitted with a butterfly valve which regulates the flow of air supplied to the cylinders. Typically, the butterfly valve has a valve body housing a valve seat engaged by a butterfly body which is engaged on a shaft in order to rotate between an open position and a closed position under the action of an electric actuator coupled to this shaft by means of a cascade of gears.

During normal operation, an internal combustion engine may become charged with static electricity which is generated essentially in the butterfly valve and in the air manifold as a result of the passage of a flow of dry air and in the petrol manifold as a result of the flow of petrol. It has been observed that the static electrical charge tends to be concentrated on the surface of the butterfly valve until the voltage generated reaches values (typically 30 000 to 60 000 V) such as to exceed the dielectric strength which separates it from a conductor body connected to earth disposed in the vicinity and thus to cause an electric arc (spark) which makes the two bodies equipotential again. This electric arc may be particularly harmful as it may damage the electronic circuits of the engine, may cause instantaneous malfunctions in the electronic circuits of the engine (typically by affecting the readings of the sensors and/or the transfer of data) and may be very dangerous in the presence of petrol fumes.

In order to remedy the drawbacks described above, U.S. Pat. No. 5,803,430-A1 proposes to insert a pair of resistors connected between the electrical terminals of the electric actuator and a wall of the intake duct at the location of the valve body. However, the solution proposed by U.S. Pat. No. 5,803,430-A1 is relatively costly because of the need to insert and connect two electrical components not normally included in the engine; experimental tests have shown, moreover, that this solution is not always able efficiently to discharge the static electricity accumulated in the butterfly valve; this solution also has an electric power that can be dissipated which is relatively modest (a characteristic which may pose problems from the point of view of complying with the constructional specifications normally imposed by manufacturers of engines for motor vehicles).

SUMMARY OF THE INVENTION

The object of the present invention is to provide a butterfly valve for an internal combustion engine which is free from the above-described drawbacks and is, in particular, simple and economic to embody.

BRIEF DESCRIPTION OF THE DRAWINGS

The present invention will be described below with reference to the accompanying drawings, which show a non-limiting embodiment thereof, and in which.

DETAILED DESCRIPTION OF THE INVENTION

Figure 1:
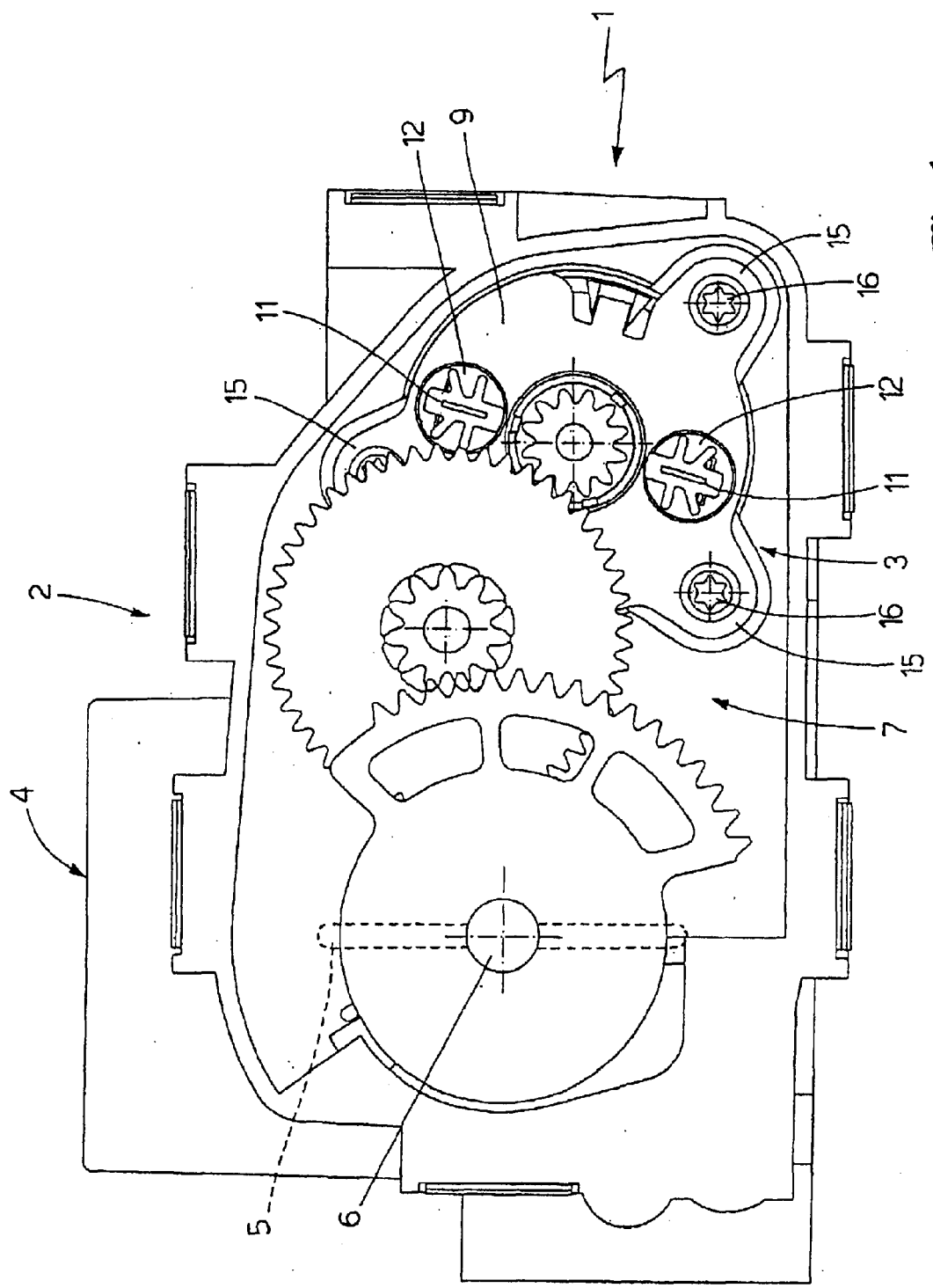
FIG. 1 is a diagrammatic front view, with parts removed for clarity, of a butterfly valve for an internal combustion engine embodied in accordance with the present invention.

In FIG. 1, a butterfly valve for an internal combustion engine is shown overall by 1; the butterfly valve 1 comprises a valve body 2 housing an electric actuator 3, a valve seat 4 and a butterfly body 5 which engages the valve seat 4 and moves between an open position and a closed position under the action of the electric actuator 3. The butterfly body 5 is in particular keyed on a shaft 6 in order to rotate between the open position and the closed position under the action of the electric actuator 3 coupled to the shaft 6 by means of a cascade of gears 7.

Figure 2:
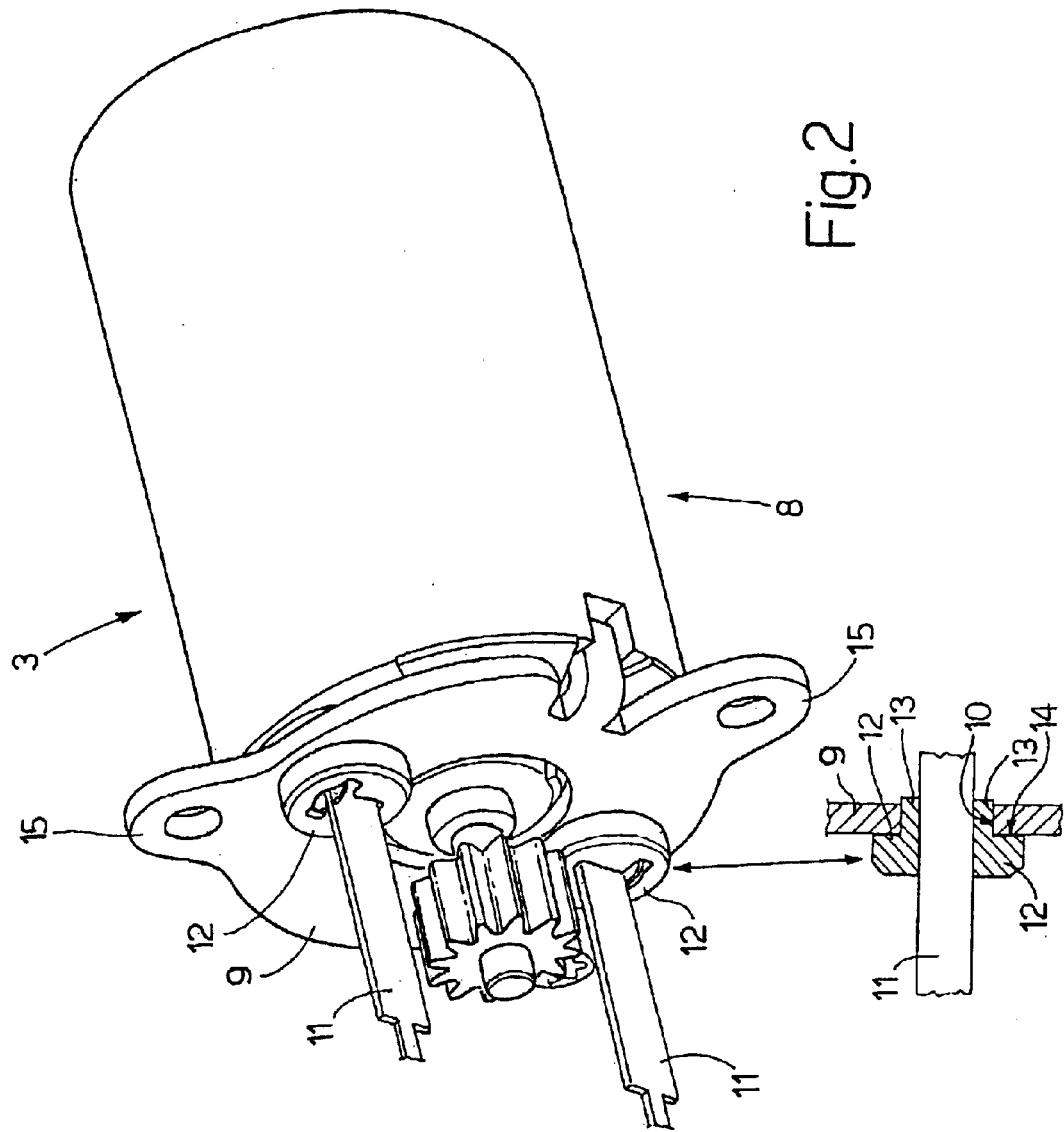
FIG. 2 is a diagrammatic perspective view of an electric actuator of the butterfly valve of FIG. 1.

As shown in FIGS. 1 and 2, the electric actuator 3 comprises a cylindrical body 8, which is bounded at the location of its base by a metal plate 9 provided with pair of through holes 10 through which two electrical conductors 11 pass and supply electricity to the electric actuator 3. A respective bushing 12, disposed electrically in contact both with the plate 9 and with the respective electrical conductor 11 and made from partially conducting material having a specific resistance of between $10^3$ and $10^6$ Ohm·cm, is interposed between each electrical conductor 11 and the respective hole 10 of the plate 9.

A lower portion 13 of each bushing 12 in particular engages the respective hole 10 and a lower surface 14 of each bushing 12 is disposed in contact with a corresponding portion of the plate 9; moreover, the electrical conductors 11 are uncovered at least at the location of the respective bushings 12.

According to a preferred embodiment, each bushing 12 is made from a conducting polymer material obtained by charging a polymer material with conducting material, and in particular by charging polyphenylene sulphide with a percentage of approximately 10% of carbon fibre, or with a percentage of approximately 20% of graphite, or with steel powder. Typically, the bushings 12 are produced by injection moulding of the conducting polymer material directly on the plate 9, connecting this plate 9 with an appropriate mould.

The main function of the plate 9 is to enable the electric actuator 3 to be secured to the valve body 2; for this purpose, the plate 9 has three drilled radial projections 15, through which respective screws 16 for fastening to the valve body 2 are inserted. Once the plate 9 is secured to the valve body 2 by means of the screws 16, this plate 9 is electrically connected to the valve body 2. According to an alternative embodiment (not shown), a spring exerting a predetermined axial force on the electric actuator 3 to keep this electric actuator 3 in the respective working position is interposed between the plate 9 and the electric actuator 3; preferably, the spring is mechanically connected to the plate 9 by a coupling of polymer material moulded simultaneously with the injection moulding of the bushings 12. The function of the spring is to keep the electric actuator 3 in position by means of a predetermined force, making it possible at the same time to compensate the axial constructional tolerances.

In use, the electrostatic charges that are concentrated in the valve body 2 of the butterfly valve 1 cannot reach a quantity such as to have a potential difference which may trigger an electric arc, since the majority of these electrostatic charges reach the plate 9 (electrically connected to the valve body 2) and are cancelled out flowing towards the conductors 11 via the bushings 12.

What is claimed is:

1. A butterfly valve for an internal combustion engine, the butterfly valve (1) comprising a valve body (2) housing an electric actuator (3), a valve seat (4) and a butterfly body (5)

which engages the valve seat (4) and moves between an open position and a closed position under the action of the electric actuator (3), the electric actuator (3) comprising a cylindrical body (8) which is bounded at the location of its base by a plate (9) provided with a pair of through holes (10) through which two electrical conductors (11) pass and supply electricity to the electric actuator (3), a respective bushing (12) being interposed between at least one electrical conductor (11) and the respective hole (10) of the plate (9), the butterfly valve (1) being characterised in that the plate (9) of the cylindrical body (8) is made from electrically conducting material and is electrically connected to the valve body (2), the bushing (12) being disposed electrically in contact both with the plate (9) and with the respective electrical conductor (11) and made from partially conducting material.

2. A butterfly valve as claimed in claim 1, in which the partially conducting material from which the bushing (12) is made has a specific resistance of between $10^3$ and $10^6$ Ohm·cm.

3. A butterfly valve as claimed in claim 1, in which a corresponding bushing (12) is interposed between each electrical conductor (11) and the respective hole (10).

4. A butterfly valve as claimed in claim 1, in which a lower portion (13) of the bushing (12) engages the respective hole (10).

5. A butterfly valve as claimed in claim 1, in which a lower surface (14) of the bushing (12) is disposed in contact with a corresponding portion of the plate (9).

6. A butterfly valve as claimed in claim 1, in which the electrical conductors (11) are uncovered at the location of the respective bushing (12).

7. A butterfly valve as claimed in claim 1, in which the plate (9) is adapted to support the electric actuator (3) and is provided with means (15) for connection to the valve body (2).

8. A butterfly valve as claimed in claim 7, in which a spring exerting a predetermined axial force on the electric actuator (3) in order to keep this electric actuator (3) in the respective working position is interposed between the plate (9) and the electric actuator (3).

9. A butterfly valve as claimed in claim 8, in which the bushing (12) is produced by injection moulding of the partially conducting material directly on the plate (9), by coupling this plate (9) with an appropriate mould, the spring being mechanically connected to the plate (9) by means of a coupling of polymer material moulded simultaneously with the injection moulding of the bushing (12).

10. A butterfly valve as claimed in claim 1, in which the bushing (12) is produced by injection moulding of the partially conducting material directly on the plate (9), by coupling this plate (9) with an appropriate mould.

11. A butterfly valve as claimed in claim 1, in which the partially conducting material from which the bushing (12) is made is a conducting polymer material.

12. A butterfly valve as claimed in claim 11, in which the conducting polymer material is obtained by charging a polymer material with conducting material.

13. A butterfly valve as claimed in claim 12, in which the polymer material is polyphenylene sulphide.

14. A butterfly valve as claimed in claim 12, in which the conducting material is carbon fibre.

15. A butterfly valve as claimed in claim 14, in which the percentage of carbon fibre is between 5% and 15%.

16. A butterfly valve as claimed in claim 14, in which the percentage of carbon fibre is between 9% and 11%.

17. A butterfly valve as claimed in claim 12, in which the conducting material is graphite.

18. A butterfly valve as claimed in claim 14, in which the percentage of graphite is between 15% and 25%.

19. A butterfly valve as claimed in claim 14, in which the percentage of graphite is between 19% and 21%.

20. A butterfly valve as claimed in claim 12, in which the conducting material is steel powder.

21. A butterfly valve as claimed in claim 1, in which the butterfly body (5) is keyed on a shaft (6) in order to rotate between the open position and the closed position, the shaft (6) being coupled to the electric actuator (3) by means of a cascade (7) of gears.

22. An electric actuator for a butterfly valve (1) for an internal combustion engine, the electric actuator (3) comprising a cylindrical body (8) which is bounded at the location of its base by a metal plate (9) provided with a pair of through holes (10) through which two electrical conductors (11) pass and supply electricity to the electric actuator (3), a respective bushing (12) being interposed between at least one electrical conductor (11) and the respective hole (10) of the plate (9), the electric actuator (3) being characterised in that the bushing (12) is disposed electrically in contact both with the metal plate (9) and with the respective electrical conductor (11) and is made from partially conducting material.

23. An electric actuator as claimed in claim 22, in which the partially conducting material from which the bushing (12) is made has a specific resistance of between $10^3$ and $10^6$ Ohm·cm.

24. An electric actuator as claimed in claim 22, in which a corresponding bushing (12) is interposed between each electrical conductor (11) and the respective hole (10).

25. An electric actuator as claimed in claim 22, in which a spring exerting a predetermined axial force on the electric actuator (3) in order to keep this electric actuator (3) in the respective working position is interposed between the plate (9) and the electric actuator (3).

26. An electric actuator as claimed in claim 25, in which the bushing (12) is produced by injection moulding of the partially conducting material directly on the plate (9), by coupling this plate (9) with an appropriate mould, the spring being mechanically connected to the plate (9) by means of a coupling of polymer material moulded simultaneously with the injection moulding of the bushing (12).

27. An electric actuator as claimed in claim 22, in which the partially conducting material from which the bushing (12) is made is a conducting polymer material obtained by charging a polymer material with conducting material.

28. An electric actuator as claimed in claim 27, in which the polymer material is polyphenylene sulphide.

29. An electric actuator as claimed in claim 27, in which the conducting material is carbon fibre.

30. An electric actuator as claimed in claim 27, in which the conducting material is graphite.

31. An electric actuator as claimed in claim 27, in which the conducting material is steel powder.

* * * * *